United States Patent [19]

Rathunde

[11] Patent Number: 5,574,851
[45] Date of Patent: Nov. 12, 1996

[54] METHOD FOR PERFORMING ON-LINE RECONFIGURATION OF A DISK ARRAY CONCURRENT WITH EXECUTION OF DISK I/O OPERATIONS

[75] Inventor: Dale F. Rathunde, Wheaton, Ill.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 482,425

[22] Filed: Jun. 7, 1995

Related U.S. Application Data

[63] Continuation of Ser. No. 48,248, Apr. 19, 1993, abandoned.

[51] Int. Cl.[6] ............................. G06F 11/00; G06F 12/00
[52] U.S. Cl. .................... 395/182.05; 395/404; 395/492; 364/242.31; 364/243; 364/245; 364/263.3; 364/268.3; 364/DIG. 1
[58] Field of Search ................................. 395/800, 575, 395/425, 400, 275, 500, 825, 828, 404, 439, 497.01, 182.05, 182.06, 183.16, 492; 371/8.1, 10.1, 11.1, 21.1, 40.1, 51.1, 67.1, 48

[56] References Cited

U.S. PATENT DOCUMENTS

| | | | |
|---|---|---|---|
| 5,166,936 | 11/1992 | Ewert et al. | 371/21.6 |
| 5,210,860 | 5/1993 | Pfeffer et al. | 395/575 |
| 5,297,258 | 3/1994 | Hale et al. | 395/275 |
| 5,303,244 | 4/1994 | Watson | 371/10.1 |
| 5,315,602 | 5/1994 | Noya et al. | 371/40.4 |
| 5,331,646 | 7/1994 | Krueger et al. | 371/40.1 |
| 5,390,187 | 2/1995 | Stallmo | 371/10.1 |
| 5,418,925 | 5/1995 | DeMoss et al. | 395/425 |
| 5,440,716 | 8/1995 | Schultz et al. | 395/441 |

*Primary Examiner*—Alpesh M. Shah
*Attorney, Agent, or Firm*—Wayne P. Bailey; James M. Stover

[57] ABSTRACT

An architecture for on-line reconfiguration on a RAID level 0, 1, 2, 3, 4 or 5 disk array. This architecture allows the computer system to perform reconfiguration of the disk array transparently, with disk I/O operations being performed concurrently with reconfiguration operations. The reconfiguration process allocates computer system resources necessary to support both the old and new array configurations during the reconfiguration process. Logical areas within the array are sequentially reconfigured from the old configuration to the new configuration. Data in each logical area is read from the area undergoing reconfiguration and thereafter overwritten in accordance with the new array configuration. System I/O requests received during reconfiguration which are directed to unreconfigured areas in the disk array are executed in accordance with the old array configuration. System I/O requests received during reconfiguration which are directed to reconfigured areas in the disk array are executed in accordance with the new array configuration.

11 Claims, 9 Drawing Sheets

RAID 4

FIG. 5 RAID 0

METHOD FOR PERFORMING ON-LINE RECONFIGURATION OF A DISK ARRAY CONCURRENT WITH EXECUTION OF DISK I/O OPERATIONS

This is a file wrapper Continuation of application Ser. No. 08/048,248, filed on Apr. 19, 1993, now abandoned.

The present invention relates to disk array storage systems and, more particularly, to a method for reconfiguring a disk array concurrent with normal disk array operations and transparent to the users of the disk array.

BACKGROUND OF THE INVENTION

RAID storage systems have emerged as an alternative to large, expensive disk drives for use within present and future computer system architectures. A RAID storage system includes an array of small, inexpensive hard disk drives, such as the 5¼ or 3½ inch disk drives currently used in personal computers and workstations. Although disk array products have been available for several years, significant improvements in the reliability and performance of small disk drives and a decline in the cost of such drives have resulted in the recent enhanced interest in RAID systems.

Numerous disk array design alternatives are possible, incorporating a few to many disk drives. Several array alternatives, each possessing different attributes, benefits and shortcomings, are presented in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and sealability that disk arrays provide in comparison to single large magnetic disks.

RAID level 1, discussed in the article, comprises N disks for storing data and N additional "mirror" disks for storing copies of the information written to the data disks. RAID level 1 write functions require that data be written to two disks, the second "mirror" disk receiving the same information provided to the first disk. When data is read, it can be read from either disk. A RAID level 1 system including four drives is depicted in FIG. 1. The drives are labeled DATA 1, MIRROR 1, DATA 2 and MIRROR 2. The blocks shown below the disk drives illustrate the manner in which data is stored on the disks.

RAID level 1 provides a high level of redundancy, high transaction performance, a minor write penalty and no recovery penalty. Although data availability is very high on RAID level 1 systems, the added expense and loss of available data storage capacity which result from supporting duplicate drives can be improved with RAID level 3, 4 and 5 systems.

RAID level 3 systems comprise one or more groups of N+1 disks. Within each group, N disks are used to store data, and the additional disk is utilized to store parity information. During RAID level 3 write functions, each block of data is divided into N portions for storage among the N data disks. The corresponding parity information is written to a dedicated parity disk. When data is read, all N data disks must be accessed. The parity disk is used to reconstruct information in the event of a disk failure. A RAID level 3 system including five drives is shown in FIG. 2. The disk drives are labeled DATA 1 through DATA 5. Data is striped across disks DATA. 1 through DATA 4, each data disk receiving a portion of the data being saved. Parity information, generated through a bit-wise exclusive-OR of the data stored on drives DATA 1 through DATA 4, is saved on drive DATA 5.

RAID level 3 provides data striping at either the byte or word level, very high data transfer rates and no penalty for write or data recovery operations. RAID level 3 systems provide best overall performance when used for large file transfers such as: decision support imaging, modeling and simulation, intensive graphics and image processing, scientific computing and CAD/CAM applications.

A RAID level 4 disk array is also comprised of N+1 disks wherein N disks are used to store data, and the additional disk is utilized to store parity information. However, data to be saved is divided into larger portions, consisting of one or more blocks of data, for storage among the disks. Writes typically require access to two disks, i.e., one of the N data disks and the parity disk. Read operations typically need only access a single one of the N data disks, unless the data to be read exceeds the block length stored on each disk. As with RAID level 3 systems, the parity disk is used to reconstruct information in the event of a disk failure. A RAID level 4 system including five drives is shown in FIG. 3. The disk drives are labeled DATA 1 through DATA 5. Data blocks are written across disks DATA 1 through DATA 4. Parity information, generated through a bit-wise exclusive-OR of the data stored on drives DATA 1 through DATA 4, is saved on drive DATA 5.

RAID level 5 disk arrays are similar to RAID level 4 systems except that parity information, in addition to the data, is distributed across the N+1 disks in each group. A RAID level 5 system is illustrated in FIG. 4. Each one of the N+1 disks within the array includes some blocks for storing data and some blocks for storing parity information. Where parity infomation is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

RAID level 5 provides data striping by system block size, parity distribution across all drives and improved transaction performance, but carries a significant write penalty. RAID level 5 systems are best utilized for super-computer or transaction processing applications requiring high I/O rates and small block sizes. RAID level 5 systems are ideal for the on-line processing needs of airline and automobile reservation centers, automatic teller and point-of-sale operations, and data base applications.

An additional disk array arrangement, referred to herein as RAID level 0, is depicted in FIG. 5. The array includes N data disks for storing data. Data is striped across the N data disks. The array controller accesses each drive independently, allowing up to N concurrent read or write operations at five different physical locations. This provides transparent load balancing and thus a performance improvement over a single disk drive. There is no parity generation or storage provided with RAID level 0, so there are no data recovery or reconstruction features as are provided with RAID levels 1, 3 and 5.

RAID level 0 provides data striping by system block size, high capacity, high transaction performance and no write penalty, but does not provide data recovery or extended data availability. This RAID level is best utilized for applications which require additional performance, but not the data availability provided by the other RAID levels.

In order to coordinate the operation of the multitude of disk drives within an array to perform read and write functions, parity generation and checking, and data restoration and reconstruction, complex storage management techniques are required. Array operation can be managed through software routines executed by the host computer system, i.e., a software array architecture, or by a dedicated hardware controller constructed to control array operations. Although each of the array configurations illustrated in FIGS. 1 through 4 includes a hardware controller, the host system could function as the array controller.

A hardware array controller improves storage reliability and availability, improves system performance and provides storage capacities larger than any single device. The hardware array controller provides this functionality utilizing minimal host processor time and without modifying user applications. A software array architecture can deliver this functionality at a lower cost of implementation, and offer more storage management and configuration flexibility than a typical hardware array controller. The increasing speed and performance of host computer systems provides software array architecture performance that is competitive with many hardware array controller products.

The hardware and software array alternatives discussed above provide improvements in performance, reliability, power consumption, sealability and capacity in comparison to single large magnetic disks. However, coincident with these improvements there exists a need to store and manage ever increasing amounts of data. Desired array management operations include the ability to reconfigure the array to change RAID levels or the size of data storage blocks, swap disk drives for preventive maintenance, perform manual sparing when a drive fails, increase the logical storage capacity, move storage to eliminate hot spots, add disks to increase throughput and tune cluster sizes to optimize load balancing. Furthermore, it is desired that the array data remain available to applications during array management operations. Thus, array management operations must be executed on-line, concurrent with normal disk array operations and transparent to most users of the system.

OBJECTS OF THE INVENTION

It is therefore an object of the present invention to provide a new and useful method for on-line reconfiguration of a disk array.

It is another object of the present invention to provide such a method in which data stored in the disk array in accordance with a first array configuration can be reorganized in accordance with a different array configuration.

It is yet another object of the present invention to provide such a method in which data striped across an array of disk drives employing a first stripe size can be reorganized employing a different stripe size.

It is still a further object of the present invention to provide a new and useful method for reconfiguring data stored on a disk array concurrent with the processing I/O requests directed to the array.

SUMMARY OF THE INVENTION

There is provided, in accordance with the present invention, a method for concurrently processing I/O requests, i.e. read or write requests, received by a disk array from a host system and reconfiguring data stored on the array. Reconfiguration of the array data may entail changing the RAID level configuration of the array, such as from a RAID level 5 configuration to a RAID level 3 configuration, and reorganizing data and parity information in accordance with the new RAID configuration, or changing the stripe or block size for data stored on the array and reorganizing data and parity in accordance with the new stripe or block size.

The described method comprises the steps of allocating computer system resources necessary to support both the current and new array configurations and sequentially reconfiguring logical storage areas within the disk array. For each logical storage area the method includes the steps of reading the logical area to retrieve data stored in accordance with the current array configuration and writing the retrieved data to the logical area in accordance with the new array configuration. The method further includes the steps of executing I/O requests directed to unreconfigured logical areas within the disk array in accordance with the current array configuration; executing I/O requests directed to reconfigured logical areas within the disk array in accordance with the new array configuration; and delaying execution of I/O requests directed to logical areas undergoing reconfiguration until the conclusion of reconfiguration.

The above and other objects, features, and advantages of the present invention will become apparent from the following description and the attached drawings.

DETAILED DESCRIPTION OF THE PREFERRED EMBODIMENT

Design Overview

Figure 1:
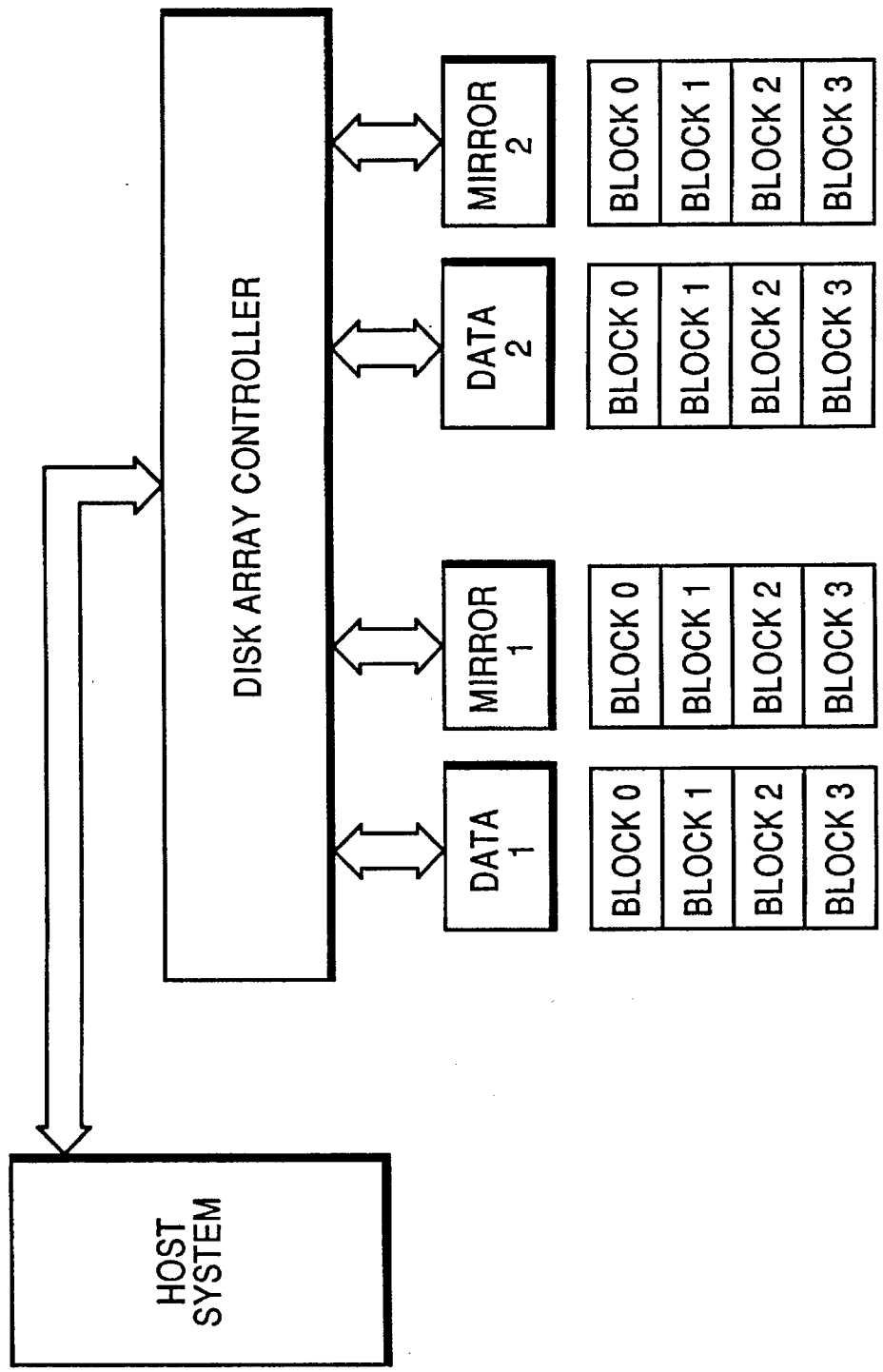
FIG. 1 is a block diagram representation of a RAID level 1 array including two data and two mirror disk drives.
Figure 2:
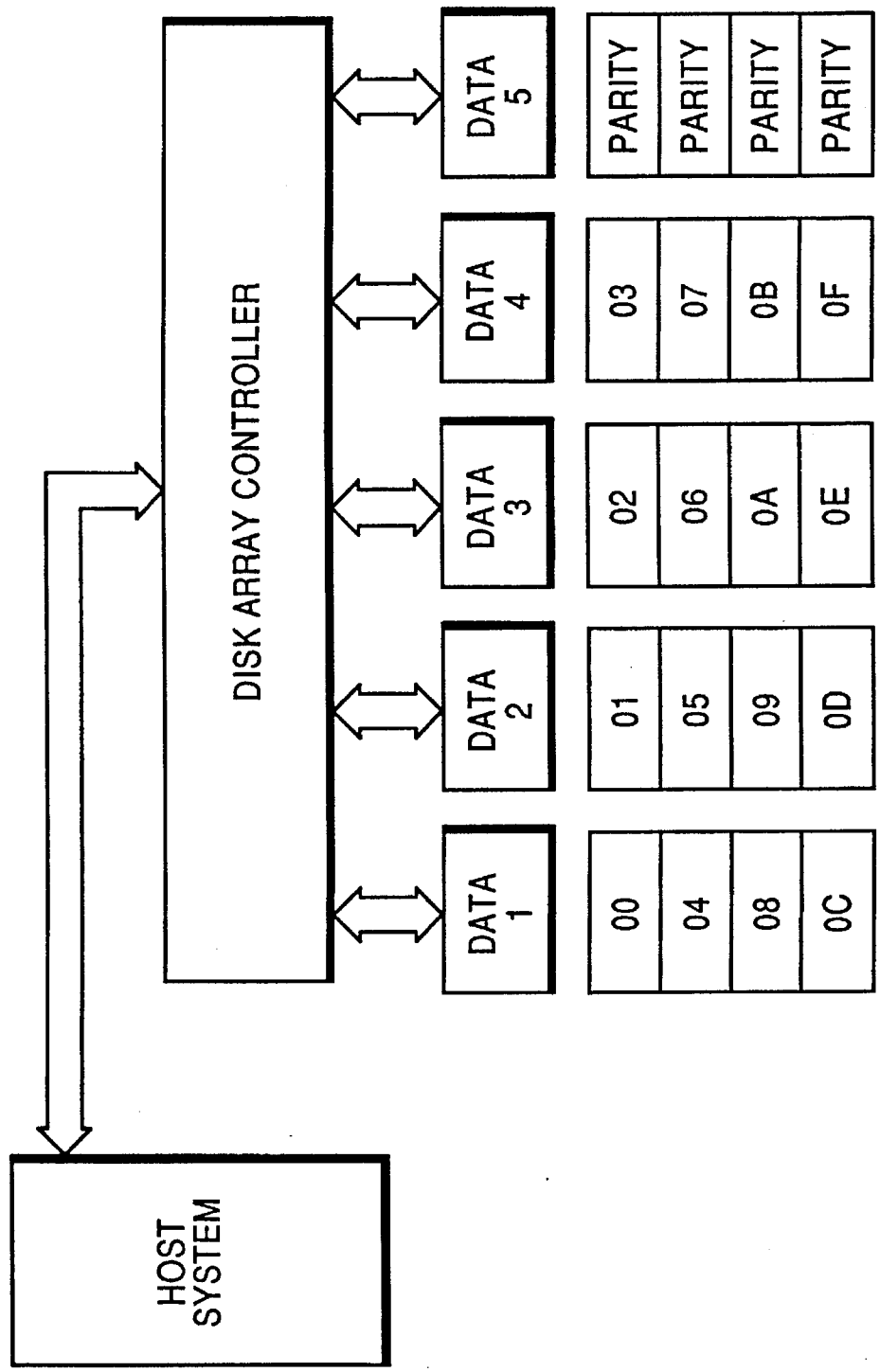
FIG. 2 is a block diagram representation of a RAID level 3 array including four data disk drives and one parity disk drive.
Figure 3:
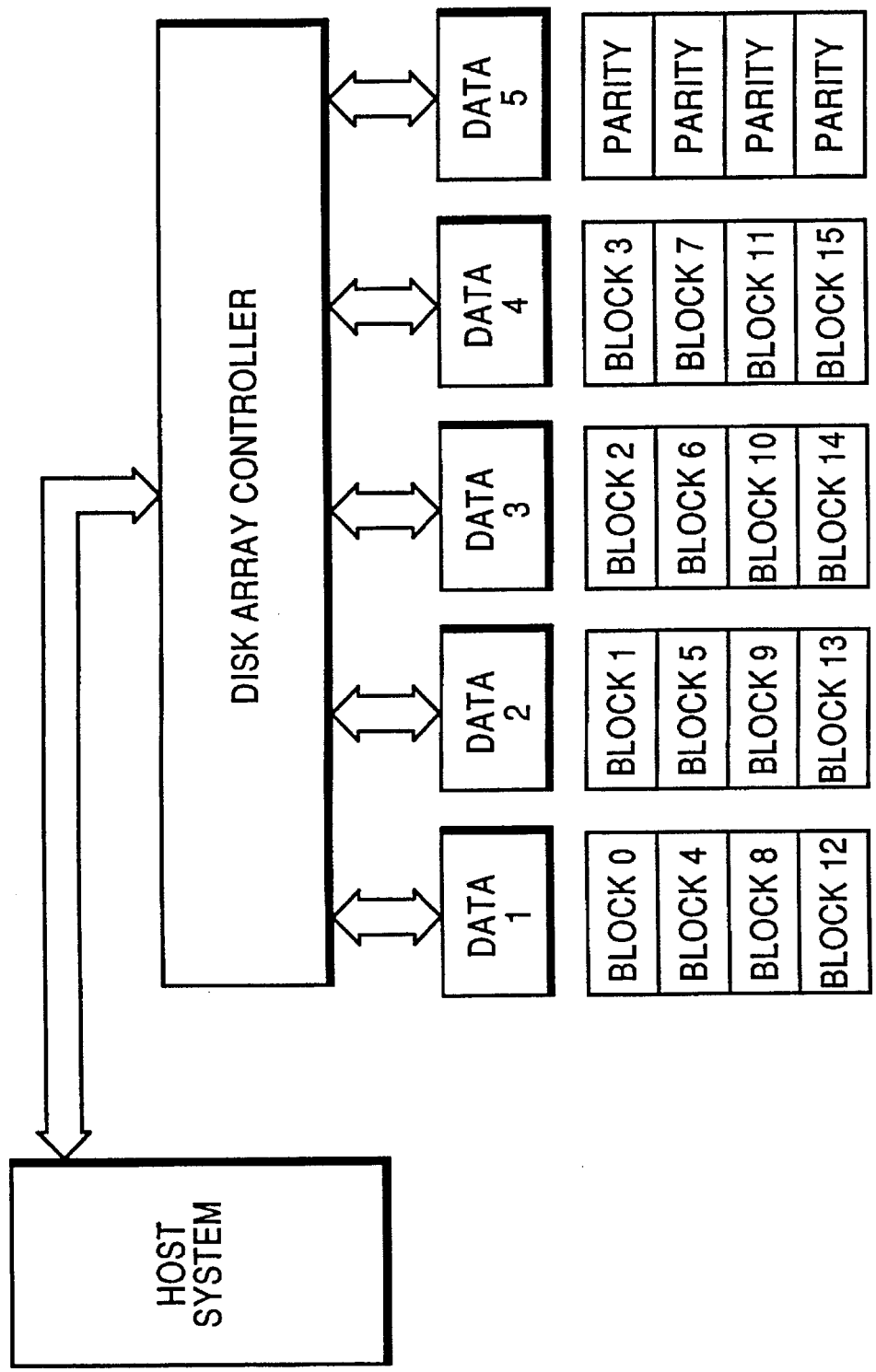
FIG. 3 is a block diagram representation of a RAID level 4 array including five disk drives.
Figure 4:
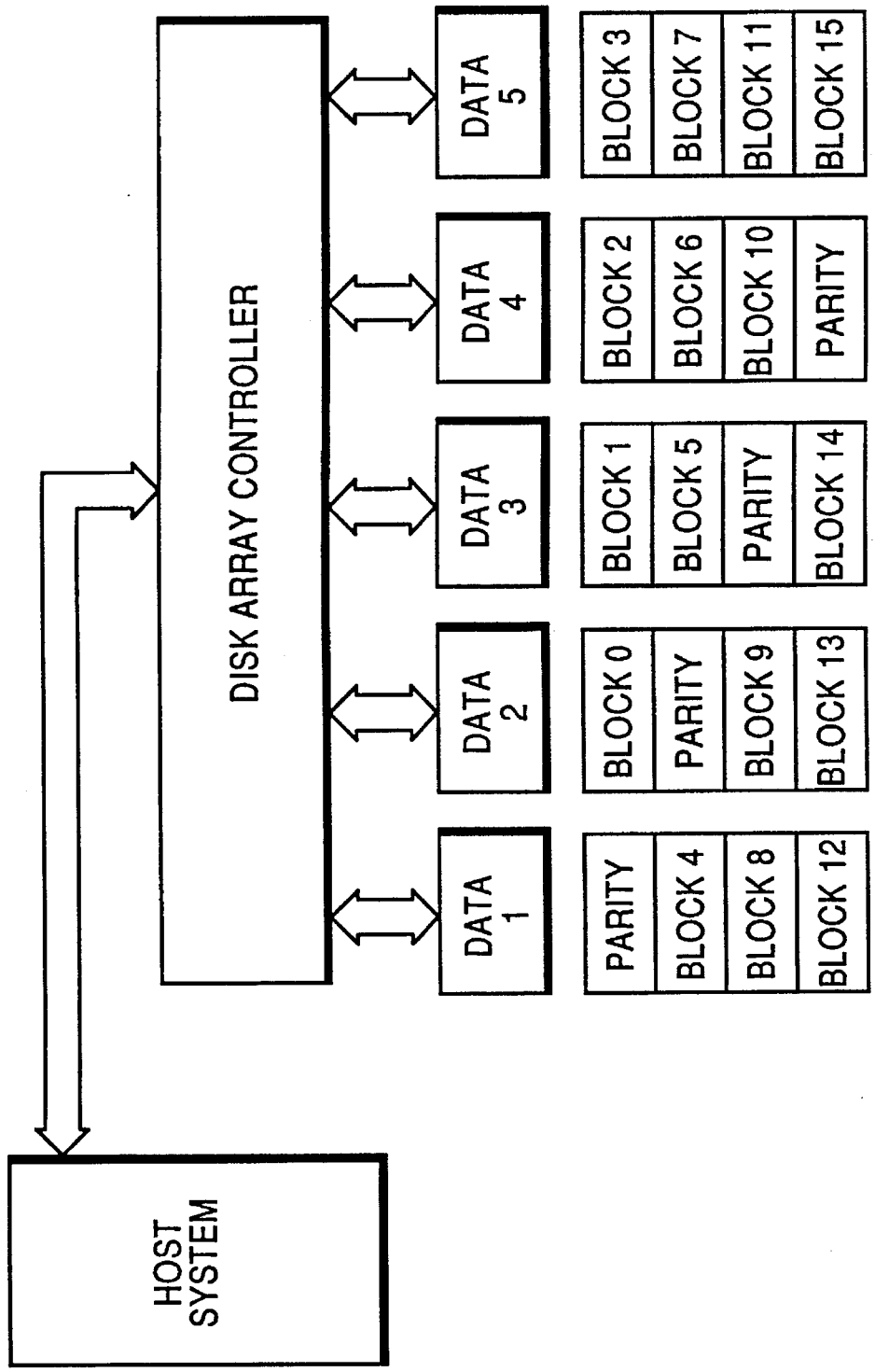
FIG. 4 is a block diagram representation of a RAID level 5 array including five disk drives.
Figure 5:
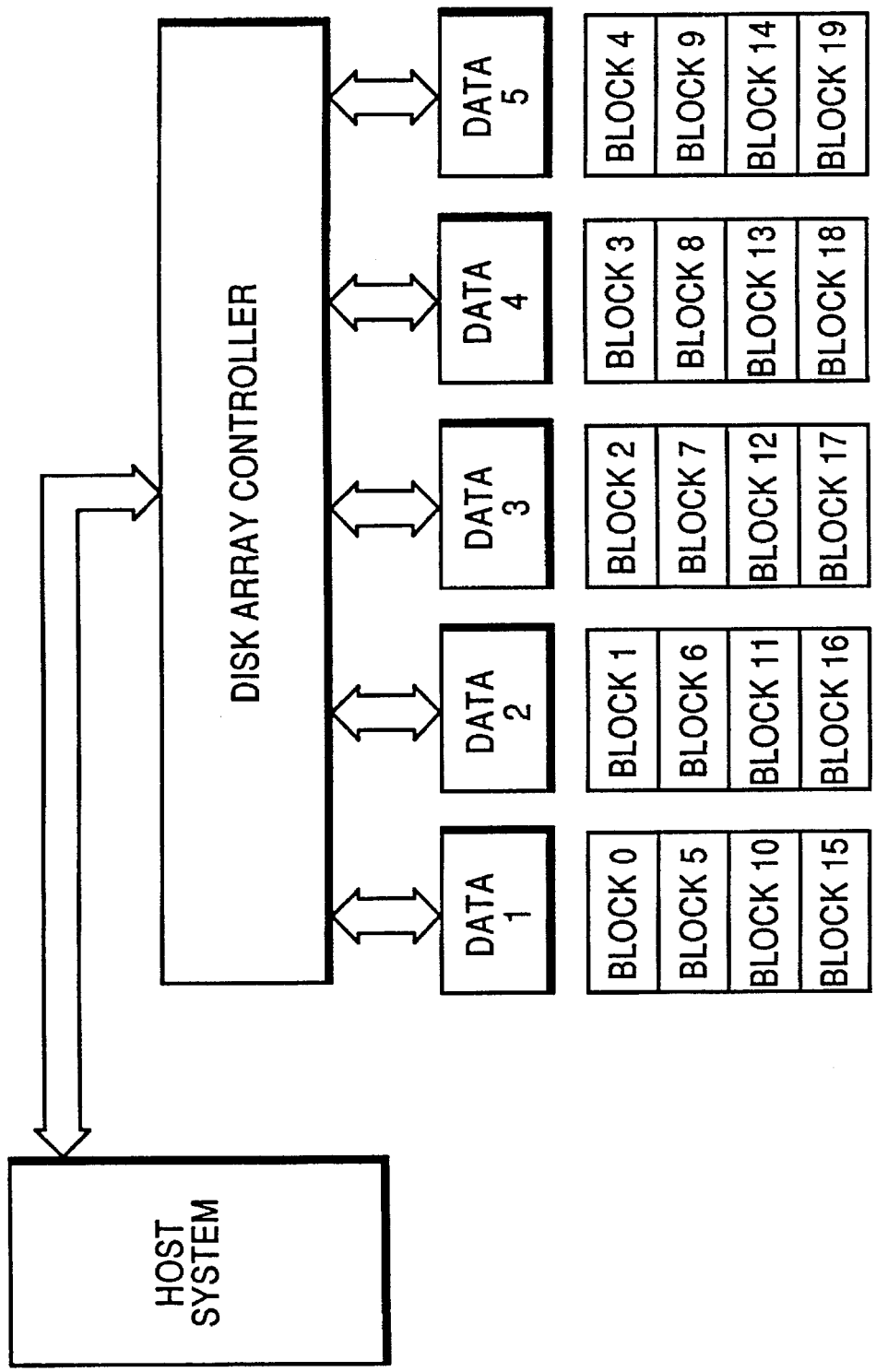
FIG. 5 is a block diagram representation of a RAID level 0 array including five disk drives.
Figure 6:
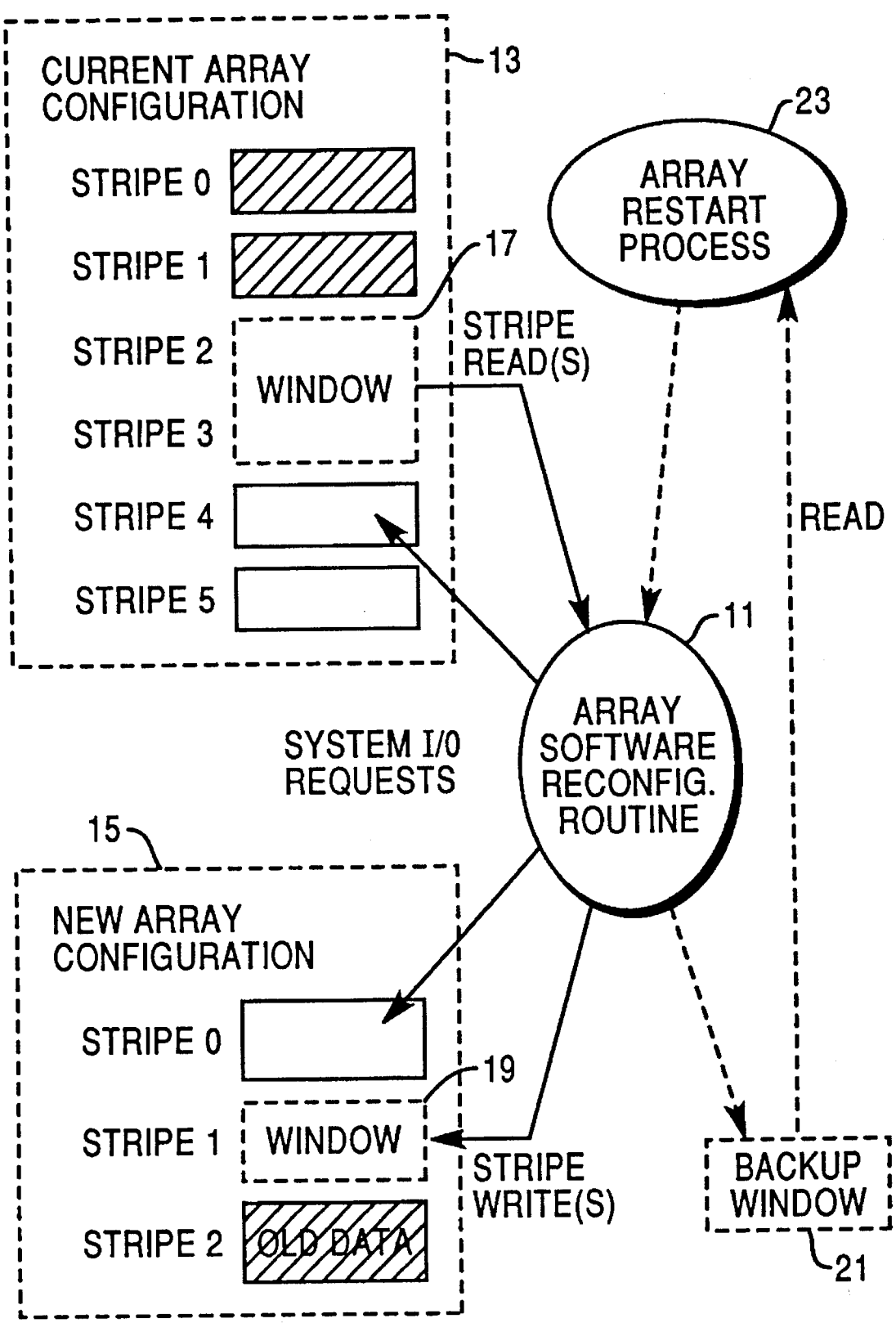
FIG. 6 is a block diagram illustration of the architecture for an on-line reconfiguration process for a disk array in accordance with the preferred embodiment of the present invention.

An overview of the architecture of a preferred embodiment of the present invention is provided in FIG. 6. The array software 11 receives a new configuration definition from the host system while supporting the current array configuration. The array software allocates the required resources to support I/O on both the current array configuration 13 and new array configuration 15 until the reconfiguration operation is completed. During on-line operations the array software maintains a sliding window, represented by reference numerals 17 and 19, to protect the logical blocks that are being modified. The number of logical blocks in the window are dependent on the cluster and stripe size characteristics of the array configurations (i.e., the array configurations are integer multiples of each others stripe size). The logical blocks in the window can only be accessed by the reconfiguration I/O requests issued by the array software 11. System I/O requests that fall in the window are blocked by the array software until the window is moved by the array reconfiguration operation.

To reconfigure the logical blocks in the window, the array software issues full stripe read and full stripe write virtual I/O operations until all data in the window is transferred. This type of virtual I/O operation also optimizes reconfiguration performance. After the data in the window is reconfigured, the window is incremented and blocked system I/O requests are allowed to proceed. As the window slides across the array configuration, system I/O requests that fall behind the window are directed by the array software to new configuration 15 and system I/O requests that fall ahead of the window are directed to the current array configuration 13.

When the reconfiguration operation completes, the array software blocks system I/O operations, waits for all outstanding I/O's to drain, swaps the array configuration information, resumes I/O operation and then returns unused system resources.

For RAID 1, 4 and 5 array configurations, a reconfiguration operation can sustain a single disk failure. If an array configuration allows for a backup window 21 to be maintained, the reconfiguration operation can also sustain a shutdown or system fault. The backup window 21 contains the logical blocks read from the current array configuration 13 and other information required to evaluate the state of the array and restart the reconfiguration operation. The array restart process 23 is responsible for initializing the array configuration so the reconfiguration operation can continue from the point of failure.

Figure 7:
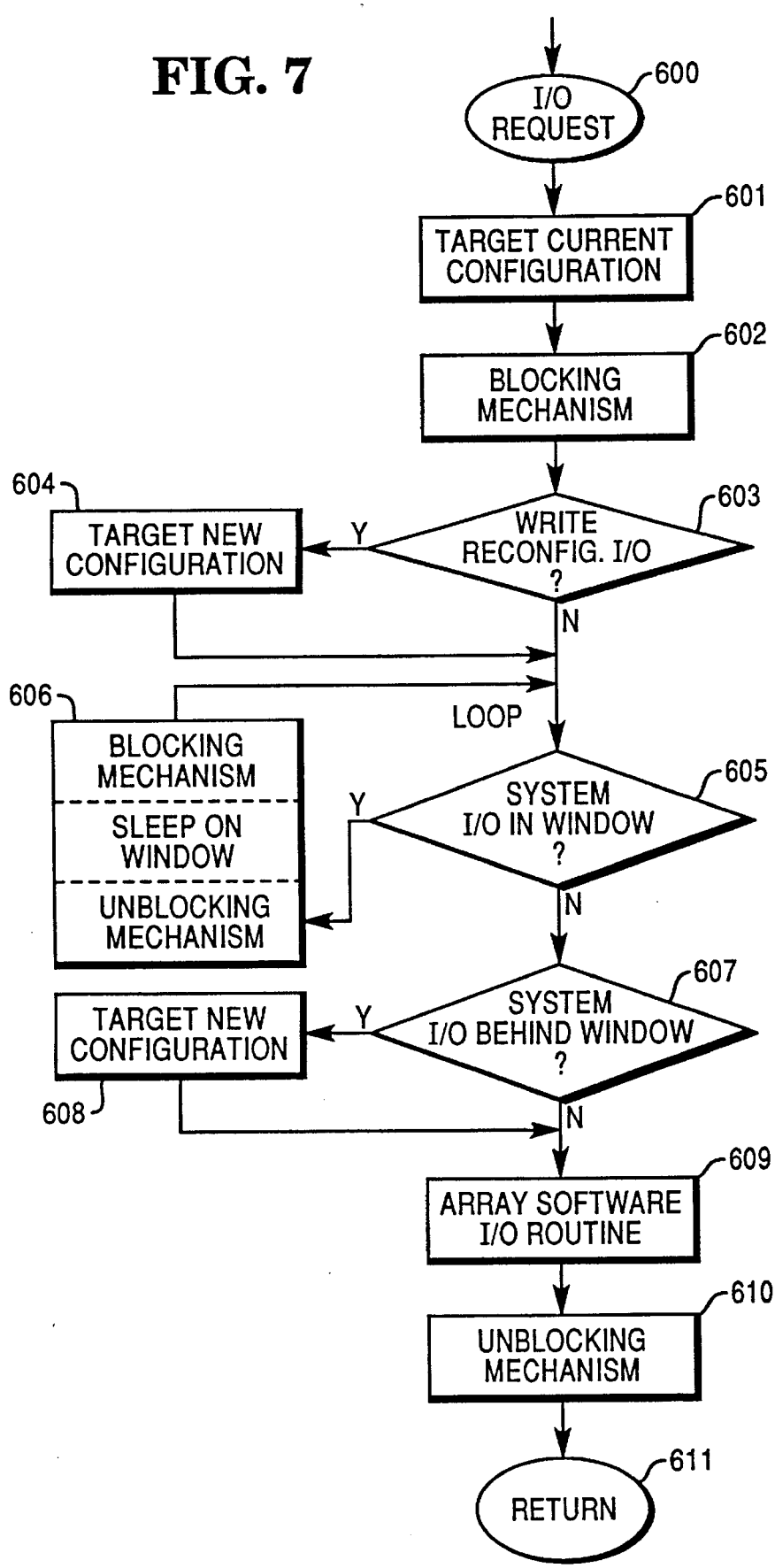
FIG. 7 is a flow chart illustrating the disk array windowing routine in accordance with the preferred embodiment of the present invention.
Figure 8:
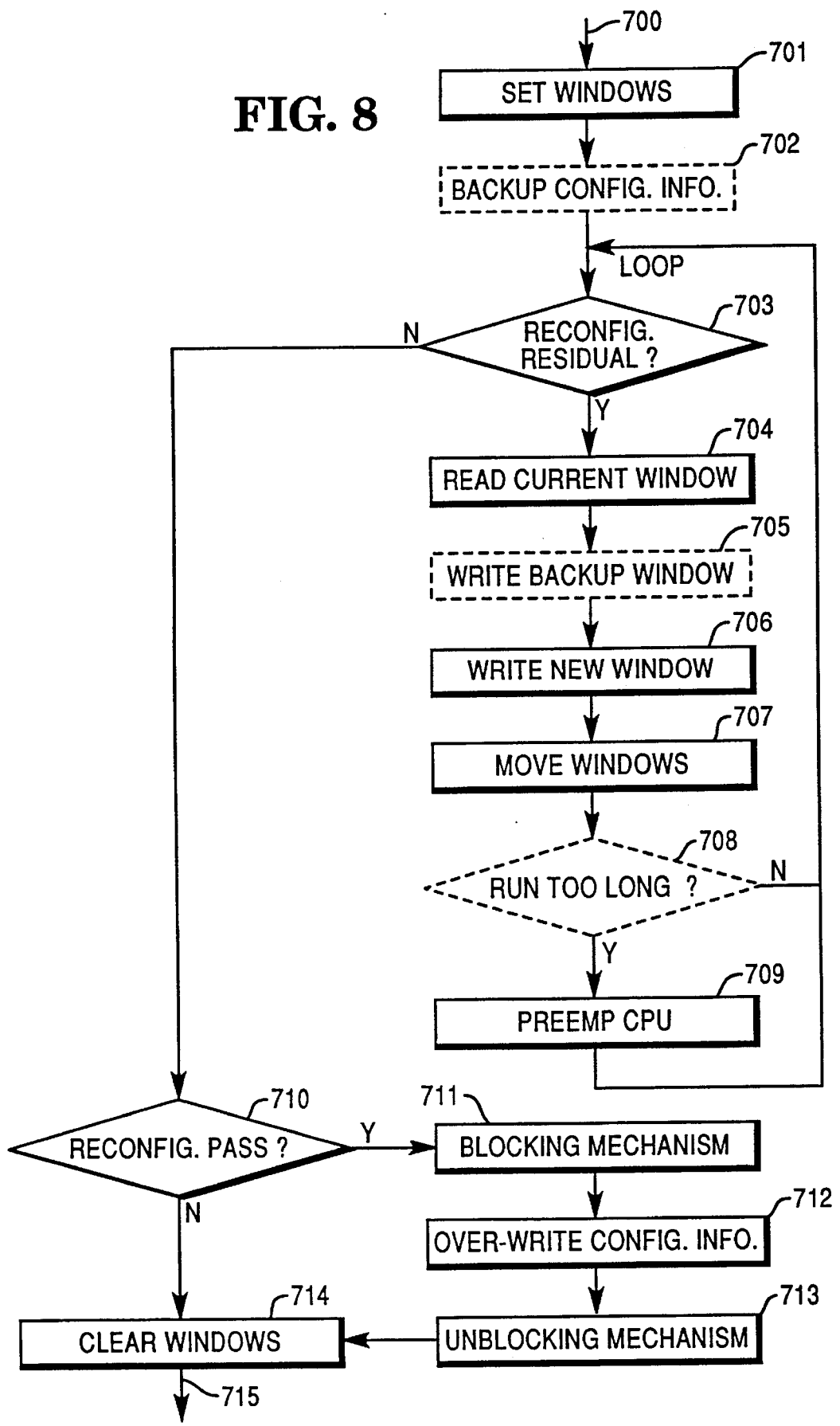
FIG. 8 is a flow chart illustrating the disk array software reconfiguration routine in accordance with the preferred embodiment of the present invention.

The software routines employed within the architecture shown in FIG. 6 to control the reconfiguration process and to coordinate the execution of system and reconfiguration I/O requests issued during the reconfiguration process are illustrated in the flow charts of FIGS. 6 through 8. The three routines illustrated, referred to as the enhanced array software I/O routine, the array software reconfiguration routine and the array software restart reconfiguration routine will now be discussed.

Enhanced Array Software I/O Routine

Array software 11 includes a routine for controlling I/O requests received from the host system which has been modified to block certain I/O operations during array reconstruction. This enhanced software array I/O routine, illustrated in the flow chart of FIG. 7, is employed by array software 11 to protect logical blocks that are being reconfigured. The illustrated process blocks system I/O requests from accessing logical blocks in the window undergoing reconstruction during an on-line array operation. This window is delimited by a low and high logical block number maintained by the array software as the window moves across the array. The major components of the enhanced software array I/O routine have been numbered in FIG. 7 and are described below.

600: A system I/O request is received from the kernel, or the array software reconfiguration routine.

601: The array software assigns its in-core configuration pointer to point to the current array configuration information. The configuration information includes the array characteristics (e.g., cluster size, number of pieces, capacity, etc.), operating state (e.g., number of drives out-of-service, state of parity, etc.) and which disk drives are configured.

602: A blocking mechanism is set to prevent the system I/O requests and array reconfiguration I/O requests from competing for array software resources. Deadlock prevention is provided by eithersingle threading the I/O requests through the array software's I/O routine during the reconfiguration operation or waiting until all resources can be acquired.

603: The I/O request received is examined to determine if the request is a reconfiguration write I/O request for the window. If the I/O request is a reconfiguration write I/O request for the window the state of the new array configuration is validated. If the data on the new configuration is not accessible the I/O request is failed.

604: The array software changes its in-core configuration pointer to point to the new array configuration information.

605: The I/O request received is examined to determine if the request is a system I/O request that addresses one or more logical blocks in the window. Note: The window only exists during on-line operations (including data restoration and parity verification operations).

606: The blocking mechanism is released to allow the reconfiguration operation to proceed. The system I/O execution is suspended until the on-line operation moves the window. When runnable, the blocking mechanism is reestablished.

607: The I/O request received is examined to determine if it is a system I/O request that is directed to addresses behind the logical blocks in the window.

608: The array software changes its in-core configuration pointer to point to the new array configuration information. The state of the new array configuration is validated. If the data on the new configuration is not accessible the I/O request is failed.

609: The array software calls the appropriate routine to issue the I/O request to the array configuration.

610: The blocking mechanism is released to allow the next I/O operation to proceed.

611: Return to the calling routine.

Array Software Reconfiguration Routine

In addition to the enhanced I/O routine discussed above, array software 11 includes a routine for directing the reconfiguration of the software array. The architecture for the array software reconfiguration routine is shown in FIG. 8. The major components of this architecture have been numbered in FIG. 8 and are described below.

700: A reconfiguration request is received from the array software I/O routine or the array software restart reconfiguration routine.

701: Kernel memory is allocated to store both current array configuration information and the data to be modified in the window. The reconfiguration window is initialized in both the current and new configuration information based on the starting logical block number passed by the calling routine. The window must begin on a stripe boundary. The size of the window is the least common stripe-width multiple (see FIG. 6).

702: Configuration information is archived if the array configuration allows for a backup window to be maintained. After the archive is completed, the state of the array is updated to indicate a reconfiguration operation is in progress.

703: Data transfer continues until all logical blocks in the array configuration or blocks specified by the calling routine have been reconfigured.

704: A read I/O request is issued to the enhanced array software I/O routine and allowed to complete. The number of bytes transferred is equal to the number of bytes in the window. The array software I/O routine will break up the job into the appropriate number of virtual I/O operations (e.g., full stripe reads).

705: The data in the current configuration window is archived if the array configuration allows for a backup window to be maintained. The window data is offset past the configuration information saved at the start of the reconfiguration operation.

This data must also be prefixed and suffixed by the window marks to allow for recovery from a system fault. Matching window marks indicate the backup window data is valid. To assure data integrity the array software must wait until the I/O has completed. If the I/O fails to the backup window the state of the array must be change to indicate the backup window is no longer valid or in use.

706: A write I/0 request is issued to the enhanced array software I/O routine and allowed to complete. The number of bytes transferred is equal to the number of bytes in the window. The array software I/O routine will break up the job into the appropriate number of virtual I/O operations (e.g., full stripe writes).

707: The current and new windows are incremented by the number of logical blocks in the window. Any processes that may be suspended on either window are allowed to continue or resume operation.

708: A specified number of I/O requests are processed without yielding control of the CPU to lower priority user processes. A preempt tunable allows the reconfiguration routine to process the I/O requests continuously without giving up control of the CPU to lower priority user processes.

709: Control of the CPU is relinquished until the kernel schedules the reconfiguration routine to run again.

710: The reconfiguration operation is checked for successful completion. If the data in the array is no longer accessible, the reconfiguration operation is failed.

711: The blocking mechanism is set to block system I/O requests, and wait for all outstanding 1/0's to drain (not shown in diagram).

712: Reconfiguration information is removed from the state of the current array configuration (not shown in diagram). The new configuration information is copied into the current array configuration memory. New array configuration resources are released.

713: The blocking mechanism is released to allow the next I/O operation to proceed.

714: The window in the current configuration information is cleared. Reconfiguration information is removed from the state of the array configuration (not shown in diagram).

715: Return to the calling routine.

Array Software Restart Reconfiguration Routine

Figure 9:
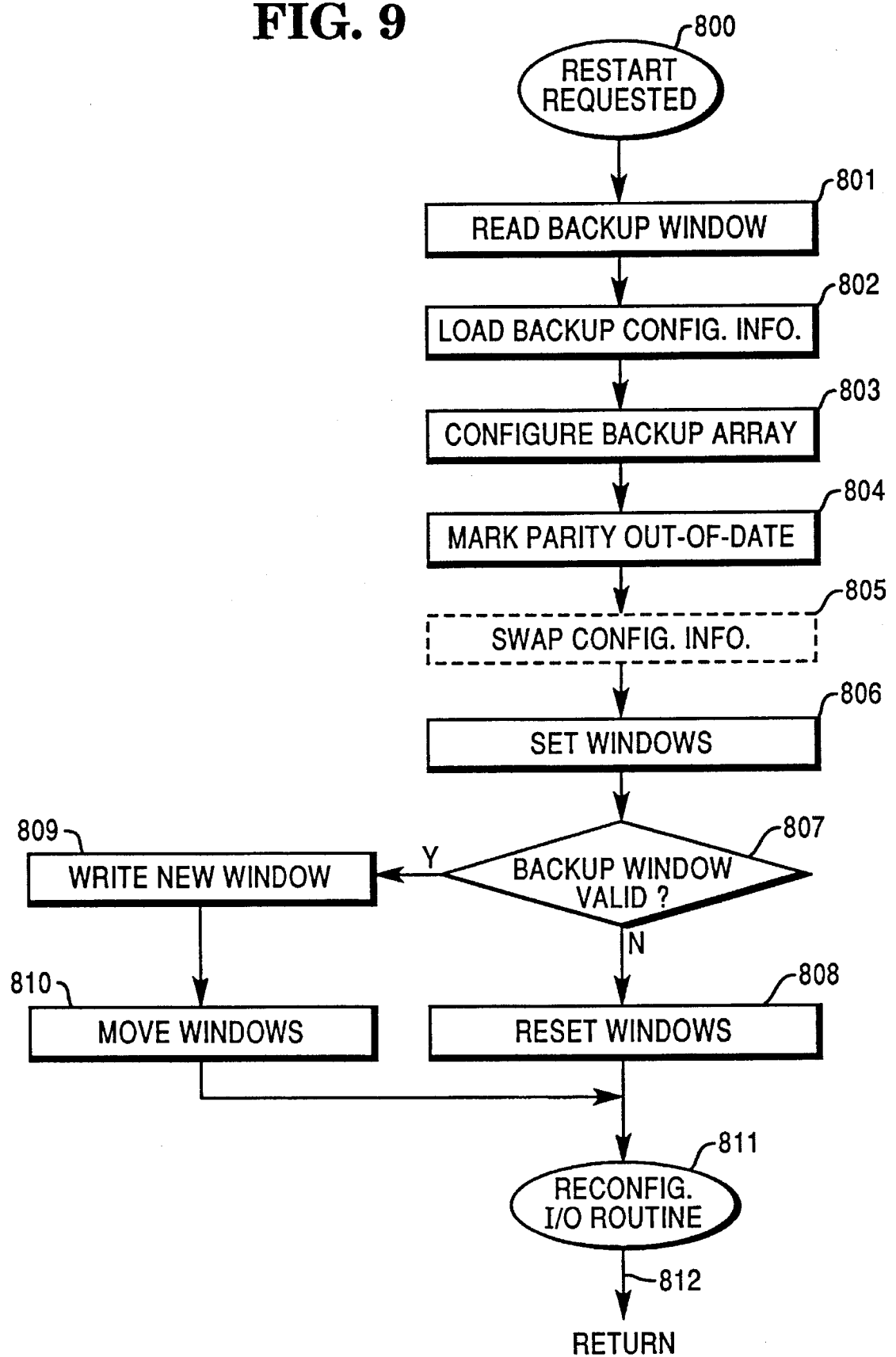
FIG. 9 is a flow chart illustrating the disk array software restart reconfiguration routine in accordance with the preferred embodiment of the present invention.

The architecture for the array reconfiguration restart routine, shown as element 23 in FIG. 6, is shown in FIG. 9. The array software evaluates the state of the array when the array is configured at boot time or start up. If the state indicates a reconfiguration was in progress and the array configuration supports a backup window, the array software spawns a process to restart the reconfiguration operation. If the state indicates a drive was out-of-service during a reconfiguration operation the array can not be accessed and the reconfiguration operation is failed, in which case the user must restore from a previous backup to assure data integrity.

The major components of this architecture have been numbered in FIG. 9 and are described below.

800: A reconfiguration restart request is received from a user process or a system process daemon. This process must not block the system from completing system initialization.

801: A read I/O request is issued to read the array configuration information from the designated backup storage device. The size of the backup window is determined based on the current configuration information. The remainder of the backup window is retrieved from the designated backup storage device.

802: Kernel memory is allocated for the backup array configuration (e.g., tables, device structure, etc.). The new configuration is propagated from the backup configuration information.

803: The backup array configuration is fully initialized (e.g., open devices, determine state of array, etc.). If an I/O error occurs on a drive the array can not be accessed and the reconfiguration operation is failed. To assure data integrity, the user must restore from a previous backup.

804: Parity is marked bad (or out-of-date) in both array configurations if the state of the array indicates the system did not follow a normal shutdown sequence. Note: When a system faults the parity may not be up-to-date with the rest of the data in the array. To assure data integrity the array must be restored after the reconfiguration operation completes. If the state of the array indicates a drive was out-of-service during a reconfiguration operation the array can not be accessed and the reconfiguration operation is failed. To assure data integrity, the user must restore from a previous backup.

805: The in-core current and new configuration information in the software array driver are interchanged.

806: The window in the current and new configuration information is initialized based on the data read from the backup storage device. The window must begin on a stripe boundary. The size of the window is the least common stripe-width multiple.

807: The window is decremented if the data in the backup window indicates the window is not valid. The backup window may not be valid if the system fault occurred when the window was being modified.

808: The current and new windows (first and last logical blocks protected) are decremented by the number of logical blocks in the window.

809: A write I/O request is issued to the enhanced array software I/O routine and allowed to complete. The number of bytes transferred is equal to the number of bytes in the window. The enhanced array software I/O routine will break up the job into the appropriate number of virtual I/O operations (e.g., full stripe writes).

810: The current and new windows are incremented by the number of logical blocks in the window.

811: The array software reconfiguration routine is called to continue the reconfiguration operation. This routine is passed the starting logical block address for the current window to continue after the point of failure.

812: Return to the calling process.

Implementation

The reconfiguration architecture discussed above has been implemented into a software array product manufactured by NCR Corporation titled "Disk Array PLUS". NCR Disk Array PLUS supports the reconfiguration architecture through the use of an administration utility and a software array driver. The software array driver supports the necessary I/O operations to optimally reconfigure the data on the array.

The first releases of NCR Disk Array PLUS are supported on UNIX based systems. In UNIX, the I/O control commands are passed to the software array driver through the ioctl( ) device driver routine. The utility uses this interface to pass the configuration information to the array driver. If the array is already configured, the array driver allocates duplicate resources to keep track of the new configuration. After the new configuration is loaded the driver calls the Array Software Reconfiguration routine shown in FIG. 8.

Release 1.0 of the NCR Disk Array PLUS product for UNIX systems does not support the optional backup window (Shown in FIG. 6 as element 21 and in FIG. 8 as steps 702 and 705). If a reconfiguration operation is in progress at the time of a system shutdown (normally or due to a failure), the array software takes the array off-line (i.e., data is no longer accessible). To assure data integrity, the user must restore the array from a previous backup.

Release 2.0 of the NCR Disk Array PLUS product on UNIX systems does support the optional backup window. This feature is referred to as fail-safe on-line reconfiguration. The following describes how this feature is implemented.

As shown in FIG. 8, the array driver must backup a copy of the array configuration information (step 702). The NCR Disk Array PLUS backs up the current array configuration instead of the new configuration. If a system fault occurs the new array configuration will be passed to the driver when the system is booted. This new configuration will initially become the current array configuration in the array software. The driver will swap the two configurations to complete the fail-safe reconfiguration operation. When the reconfiguration completes the driver and system administration file used by the utility will be synchronized.

The NCR Disk Array PLUS also supports a "hot spare" disk that will be used to archive the backup window. The spare disk drive is not utilized during a reconfiguration operation since this would require the array software to maintain multiple windows across the array configuration. Using the spare drive to archive the window data will minimize the amount of seek operations on the array configuration. This will minimize the performance degradation due to the backup window. If a disk drive fails on a RAID level 1, 4 or 5 array during a reconfiguration operation, the spare disk will be restored immediately after the reconfiguration completes. For a RAID 0 configuration a smaller capacity spare disk will be supported to accommodate the fail-safe reconfiguration feature.

The layout of the NCR Disk Array PLUS backup window is shown below:

| Sector 0 | | | Sector N |
|---|---|---|---|
| Configuration Information | Window Number | Window Data | Window Number |

The first part of the backup window contains the current array configuration information. This includes the device structure followed by a piece structure for each disk in the array. The device structure includes the information to determine the number of disks in the array. This will allow the array software to determine the length of the configuration information data on the spare disk.

The remainder of the backup window includes the data read from the current array configuration window. This data is surrounded by markers labeled window number that allow the array software to determine if a system fault occurred when writing to the backup window. These markers will be initialized to negative one. During the reconfiguration operation the array software will increment the marker values. The marker value will be the number of the window being reconfigured. For example, a backup window that starts with window number 2 and ends with window number 1, would indicate a fault occurred before window number two was reconfigured. Since the second window number was not written successfully, the data in window 2 on the array was not modified. However, if the backup window starts with window number 2 and ends with window number 2, the fault must have occurred while window 2 was being reconfigured. In this case, the data in the backup window must be used to re-write window 2 on the new array configuration.

The NCR Disk Array PLUS restart process will be spawned by a new inittab entry added for the fail-safe feature. This new entry will not wait for the utility to complete execution, unlike the current entry that is used to configure all arrays in the system. This new entry will call a new boot script (in init.d) to restart a reconfiguration operation, if needed. The reconfiguration operation will be invoked in the same manner as the restore operation when the system is booting. The restore boot script queries each array to determine if parity is out-of-date. For the fail-safe feature, the array driver will flag to the utility that the data on the array is out-of-date. The new boot script will batch the utility to perform an on-line reconfiguration operation. The array driver will continue the reconfiguration operation at or before the point of failure. When the fail-safe reconfiguration operation completes, the root login will receive mail.

The array software marks the parity out-of-date when the current and new arrays are configured if the reconfiguration operation was in progress at the time of a system shutdown due to a failure. If no disk drives are out-of-service in the array, the data in the array will be accessible and the reconfiguration operation can continue. However, if a system fault occurred on an array with one disk drive out-of-service the array will be taken off-line. To assure data integrity, the user must restore the array from a previous backup.

It can thus be seen that there has been provided by the present invention a method for reconfiguring a disk array concurrent with normal disk array operations and transparent to the users of the disk array. Ideally the on-line reconfiguration architecture described above will be implemented within a system which will allow an array to tune itself for optimal performance, balancing the layout of data across the array drives, and will also allow the host computer system to reconfigure system storage, balancing the layout of data across multiple storage areas.

Those skilled in the art will recognize that the invention is not limited to the specific embodiments described above and that numerous modifications and changes are possible without departing from the scope of the present invention. For example, the method of the present invention can be utilized within arrays configured in accordance with RAID levels 0, 1, 2, 3, 4 or 5, or other known array configurations, and arrays including more or less than five drives. Additionally, the invention may be utilized on any virtual or logical storage device, including non-array storage devices.

The invention may be implemented in software for use on UNIX based systems as well as other operating systems, or may be implemented in hardware controllers for advanced storage subsystems under any operating environment.

In addition to utilization within a single host system, the invention may be utilized for single-point storage administration for a cluster of host systems where one system initiates that the reconfiguration operation and propogates the window to the other host systems sharing the same storage devices. The invention may also be utilized for data migration between storage devices on one or more host systems and for data reconstruction or parity verification operations on arrays having the same configuration.

Although the presently preferred embodiment of the invention has been described, it will be understood that various changes may be made within the scope of the appended claims.

What is claimed is:

1. In a computer system including an array of disk drives for use in storing information comprising one of data and parity, a method for reconfiguring stored information between a first disk array configuration and a second disk array configuration, comprising the steps of:

providing a predetermined number of disk drives in said array of disk drives, with said predetermined number of disk drives being all of said disk drives in said array of disk drives;

transferring information to all of said predetermined number of disk drives for storage therein in accordance with said first disk array configuration, wherein said information includes data that is stored in a plurality of said predetermined number of disk drives;

deciding to reconfigure said information from said first disk array configuration to said second disk array configuration;

wherein said first disk array configuration includes at least one of: (a) a RAID level selected from a group that includes one or more of the following: RAID levels 0, 1, 2, 3, 4, and 5; and (b) a first plurality of stripes for storing the information and having a first size;

wherein said second disk array configuration includes at least one of: (i) a RAID level selected from a group that includes one or more of the following: RAID levels 0, 1, 2, 3, 4, and 5, and being different from said RAID level selected for said first disk array configuration and (ii) a second plurality of stripes for storing information and having a second size that is different from said first size of said first disk array configuration;

reconfiguring said information from said first disk array configuration to said second disk array configuration during a single reconfiguration using said same predetermined number of disk drives that are used in said transferring information step, wherein said reconfiguring step includes:

reading said information from said same predetermined number of disk drives according to said first disk array configuration; and writing said information from said reading information step to said same predetermined number of disk drives according to said second disk array configuration.

2. The method in accordance with claim 1, wherein:

within said first and second disk array configurations information is saved across said predetermined number of disk drives in stripes; and each one of said predetermined number of disk drives comprises a plurality of said stripes.

3. The method in accordance with claim 1, wherein:

said second size of said second plurality of stripes within said second disk array configuration is a multiple of said first size of said first plurality of stripes within said first disk array configuration.

4. The method in accordance with claim 1, wherein:

said first size of said first plurality of stripes within said first disk array configuration is a multiple of said second size of said second plurality of stripes within said second disk array configuration.

5. The method in accordance with claim 1, further comprising the steps of:

saving said information from said reading step to a backup storage;

sensing an error in the operation of said computer system;

providing said information saved to said backup storage for said writing step in response to said sensing an error step; and purging said information saved to said backup storage after said writing step.

6. The method in accordance with claim 1, wherein:

said first disk array configuration is one of the group comprising RAID level 0, 1, 2, 3, 4, and 5 array configurations; and said second disk array configuration is one of the group comprising RAID level 0, 1, 2, 3, 4, and 5 array configurations.

7. The method of reconfiguring in accordance with claim 1, further comprising the steps of:

storing first address information for identifying information from said transferring information step stored in accordance with said first disk array configuration and free of storage in accordance with said second disk array configuration;

storing second address information for identifying said information from said writing step stored in accordance with said second disk array configuration;

comparing address information associated with an I/O request received by said array of disk drives with said stored first and second address information;

executing said I/O request in accordance with said first disk array configuration when said address information associated with said I/O request is wholly within said stored first address information;

executing said I/O request in accordance with said second disk array configuration when said address information associated with said I/O request is wholly within said stored second address information; and delaying execution of said I/O request when said address information associated with said I/O request is within both said stored first and second address information until said address information associated with said I/O request is wholly within said stored second address information.

8. The method in accordance with claim 1, wherein:

said reading step includes reading said information from one of: (a) at least one of said same predetermined number of disk drives and (b) each of said same predetermined number of disk drives; and said writing step includes writing said information including said same data from said reading information step to the other one of: (i) at least one of said same predetermined number of disk drives and (ii) each of said same predetermined number of disk drives.

9. A computer system comprising:

an array of disk drives for storing information comprising at least one of data and parity; and means for reconfiguring said information stored within said disk drives from a first configuration to a second configuration, wherein said means for reconfiguring includes reading means for reading said information stored within said disk drives according to said first configuration and writing means for writing said information that was read using said reading means to said disk drives according to said second configuration;

wherein said first configuration includes at least one of: (a) a RAID level selected from a group that includes one or more of the following: RAID levels 0, 1, 2, 3, 4, and 5; and (b) a first plurality of stripes for storing information and having a first size, and said second configuration includes at least one of: (i) a RAID level selected from a group that includes one or more of the following: RAID levels 0, 1, 2, 3, 4, and 5, and being different from said RAID level selected for said first configuration and (ii) a second plurality of stripes for storing information and having a second size that is different from said first size of said first configuration.

10. The computer system of claim 9, wherein:

said first configuration includes one of: (a) RAID level 1 and (b) a RAID level selected from a group that includes one of the following: RAID levels 0, 2, 3, 4, and 5, and said second configuration includes the other one of: (i) RAID level 1 and (ii) a RAID level selected from a group that includes one of the following: RAID levels 0, 2, 3, 4, and 5.

11. The computer system of claim 9, wherein:

said means for reconfiguring reads said information from one of: (a) at least one of said disk drives and (b) each of said disk drives and writes said information including the same data as read to the other one of: (i) at least one of said disk drives and (ii) each of said disk drives, when said information is reconfigured from said first configuration to said second configuration.

* * * * *